United States Patent

Iimura et al.

[15] 3,640,867

[45] Feb. 8, 1972

[54] LITHIUM-ZINC FERRITE COMPOSITION WITH ARSENIC OXIDE OR BISMUTH OXIDE ADDITIVE

[72] Inventors: Tsutomu Iimura, Hachioji-shi; Susumu Kurokawa, Mobara-shi; Masayuki Emoto, Kodaira-shi, all of Japan

[73] Assignee: Hitachi, Ltd., Tokyo, Japan

[22] Filed: May 7, 1969

[21] Appl. No.: 822,366

[30] Foreign Application Priority Data

May 10, 1968 Japan....................................43/30903

[52] U.S. Cl.........................................252/62.61, 252/62.62

[51] Int. Cl..........................................................C04b 35/26

[58] Field of Search...................................252/62.61, 62.62

[56] References Cited

UNITED STATES PATENTS

| | | | |
|---|---|---|---|
| 3,370,011 | 2/1968 | Kitagawa | 252/62.62 |
| 3,372,122 | 3/1968 | Lessoff | 252/62.61 |

*Primary Examiner*—Robert D. Edmonds
*Attorney*—Craig, Antonelli & Hill

[57] ABSTRACT

A lithium-zinc ferrite composition most suitable for use as magnetic memory cores in high-speed electronic computer, which consists of 10 to 30 mol percent of $Li_20$, 3.5 to 20 mol percent of Zn0 and 70 to 85 mol percent of $Fe_20_3$ as the main components; and in addition at least one metal oxide selected from the group consisting of vanadium oxide, arsenic oxide and bismuth oxide as subcomponents, the content of the metal oxide being 0.01 to 1 percent by weight with respect to the main components.

8 Claims, 5 Drawing Figures

INVENTORS

TSUTOMU UEMURA, SUSUMU KUROKAWA and MASAYUKI EMOTO

BY
Craig, Antonelli, Stewart & Hill

ATTORNEYS

INVENTORS

TSUTOMU IIMURA, SUSUMU KUROKAWA and MASAYUKI EMOTO

BY

Craig, Antonelli, Stewart & Hill

ATTORNEYS

INVENTORS

TSUTOMU UEMURA, SUSUMU KUROKAWA and MASAYUKI EMOTO

BY
Craig, Antonelli, Stewart & Hill
ATTORNEYS

INVENTORS
TSUTOMU IIMURA, SUSUMU KUROKAWA
and MASAYUKI EMOTO
BY Craig, Antonelli, Stewart & Hill
ATTORNEYS

LITHIUM-ZINC FERRITE COMPOSITION WITH ARSENIC OXIDE OR BISMUTH OXIDE ADDITIVE

BACKGROUND OF THE INVENTION

This invention relates to a lithium-zinc system ferrite composition most suitable for use as magnetic memory cores in a high-speed electronic computer, and more particularly to an improved lithium-zinc system ferrite composition exhibiting good square hysteresis, high signal output voltage and high-speed switching time characteristics.

It has been known that a ferrite composition having square hysteresis loop is useful as the magnetic memory core for an electronic computer and as the magnetic cores for magnetic switch and magnetic amplifier.

Especially, it is important that the ferrite composition for magnetic memory cores has good square hysteresis and good temperature characteristics and at the same time it is an essential requirement that it exhibits high signal output voltage and high-speed switching time characteristics under a low drive current. As a ferrite composition for magnetic memory cores, Mn-Mg system ferrite has generally been used, but since this ferrite has insufficient temperature characteristic, researches have been continued on the development of Li-system ferrite having good temperature characteristic. The conventional Li-system ferrite may exhibit good temperature characteristic, but has no sufficient signal output voltage.

Although addition of zinc to Li-system ferrite has proved to be somewhat effective to improve the signal output voltage characteristic, it extremely deteriorates its square hysteresis property. Thus, no ferrite composition which has a high signal output voltage while maintaining a good square hysteresis required for a magnetic memory core has been obtained.

SUMMARY OF INVENTION

It is therefore the primary object of this invention to provide a ferrite composition having a high signal output voltage and a high-speed switching time as well as an excellent square hysteresis characteristic.

It is another object of this invention to provide a ferrite composition particularly suitable for a memory core of a high-speed electronic computer.

The foregoing objects are attained by providing a ferrite composition which consists essentially of 10 to 30 mol percent of $Li_2O$, 3.5 to 20 mol percent of ZnO and 70 to 85 mol percent of $Fe_2O_3$ as main components and 0.01 to 1 percent by weight of said main components of at least one metal oxide selected from the group consisting of vanadium oxide, arsenic oxide and bismuth oxide as subcomponents.

Said ferrite composition of this invention is produced by prefiring the raw material mixtures in an oxygen-containing atmosphere at 800°–1,000° C. for at least 30 minutes, grinding thus prefired product by a ball mill or roll mill, molding the ground product into a desired shape and firing the molded product in an oxygen-containing atmosphere at 1,050°–1,150° C. for at least 4 minutes. Said mixing or grinding by ball mill or roll mill may be carried out by a wet method with an addition of water or an organic solvent such as alcohol.

In the production of the ferrite composition of this invention, the raw materials are mixed at such proportions as desired in the final product and oxides or compounds convertible into the oxides by firing, such as carbonates, nitrates and oxalates are used and the amounts of these compounds being sufficient to produce oxides.

The various other characteristics, advantages and other objects of this invention will become apparent by the following detailed description when read in conjunction with the accompanying drawing which shows the preferred examples of this invention.

In order to promote the understanding of this invention, explanations of the general magnetic characteristic and the method for measuring it will be given below.

Usually, the degree of square hysteresis characteristic of a ferrite composition is defined by the squareness ratio $Rs=Br/Bm$ wherein $Br$ represents residual flux density and $Bm$ does saturation flux density. The ferrite composition whose squareness ratio $Rs$ is nearer 1 has better square hysteresis characteristic of hysteresis loop and is excellent as material for memory core.

The value of $Rs$ required as the material for a good memory core is at least 0.7 or more.

DESCRIPTION OF THE PREFERRED EMBODIMENTS:

Figure 1:
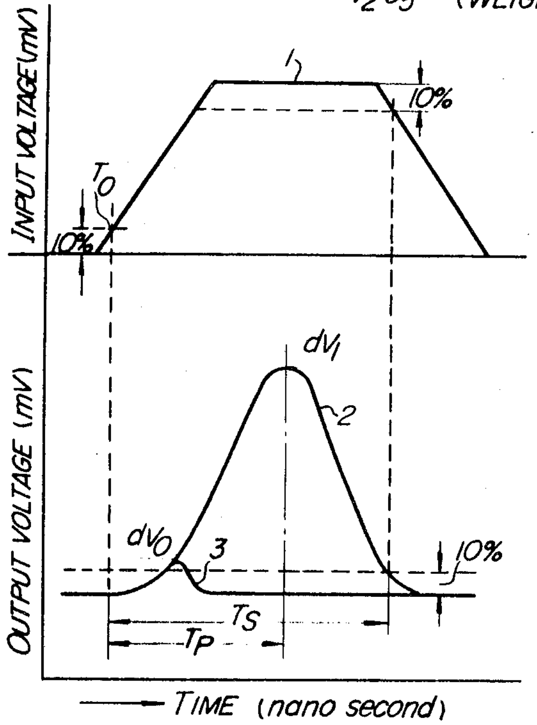

FIG. 1 shows waveforms of input voltage and output voltage !hen pulse current is passed through memory core. In this Figure, the ordinate represents voltage (mv.) and abscissa shows time (nsec.). Curve 1 is a waveform of input pulse voltage and curve 2 is that of signal output voltage and the maximum of said signal output voltage is represented by $dV_1$, which is made to correspond to "1" or "0" in binary system. Curve 3 shows waveform of noise output voltage and the maximum value thereof is shown by $dV_0$. The quality of material for memory core is evaluated by quotient of said voltages $dV_1/aV_0$ namely, S/N ratio. Ts is usually called switching time and is measured by the time required for the signal output voltage to reach 10 percent of the maximum $dV_1$ from $To$. $To$ is usually called reference point and is defined as the 10 percent level of the leading edge of linearly increasing current pulse. $Tp$ is commonly called peaking time and is shown by the time required for the signal output voltage to reach the maximum value $dV_1$ from the reference point $T0$.

The characteristics required for the material for memory core are not only that squareness ratio $Rs$ is close to 1 as much as possible, but also that said quotient $dV_1/dV_0$ is large and $Ts$ is small.

The inventors manufactured a ring core of 0.3 mm. in outside diameter, 0.2 mm. in inside diameter and 0.1 mm. in thickness and measured $Rs$, $dV_1$ and $dV_0$ in order to find that the core satisfies $Rs \geqq 0.85$ and quotient $dV_1/dV_0>3.5$. In an experiment, said excellent characteristics could not be attained by using a conventional lithium-zinc system ferrite composition to which no subcomponents are added.

Figure 2:
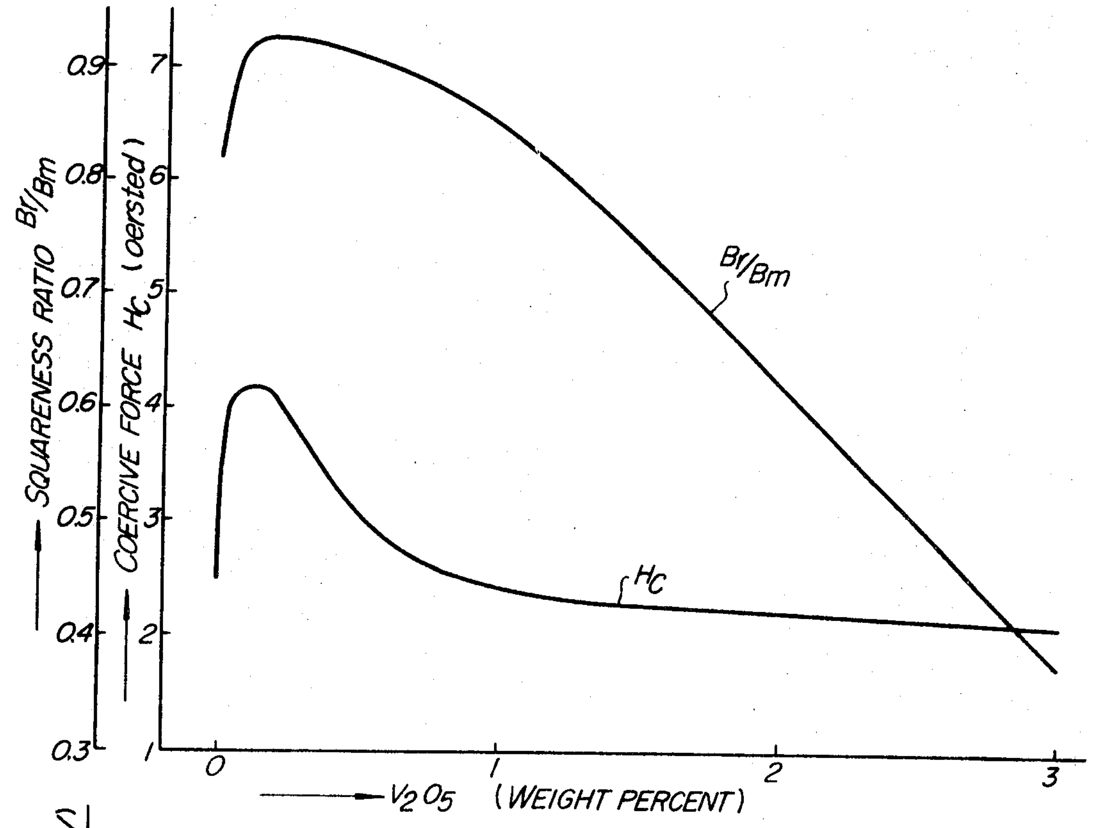

FIG. 2 shows characteristic curves which indicate changes of coercive force Hc and squareness ratio $Rs=Br/Bm$ obtained when vanadium is used as subcomponent. The sample was prepared by adding 0–3 percent by weight of vanadium pentoxide to a mixture consisting of 5 mol percent of zinc oxide, 15 mol percent of lithium carbonate and 80 mol percent of ferric oxide, and by treating the mixture in the same manner as shown in Example 1. From FIG. 2, it is clear that vanadium pentoxide has good effect on the improvement of square hysteresis characteristic and coercive force H$c$, and that addition of 0.01–1 percent by weight is effective and that of about 0.1 percent is most effective. That is, when the addition amount exceeds 1 percent, said values are lower than those of ferrite core having no vanadium pentoxide and no effects of the addition are observed. On the other hand, addition of less than 0.01 percent does not result in no remarkable effects on the improvement of the characteristics. Thus, the addition amount of vanadium pentoxide is preferably 0.01–1 percent by weight, more preferably 0.06–0.5 percent, and especially preferably about 0.1 percent. That is, squareness ratio $Rs \geqq 0.85$ with addition of 0.01–1.0 percent, $Rs \geqq 0.90$ with addition of 0.06–0.5 percent and $Rs = 0.92$–0.93 with addition of about 0.1 percent. Vanadium was referred to as an additive in the above explanation. However, nearly the same results were obtained using arsenic and bismuth. Therefore, explanations regarding these additives are omitted.

Regarding the reasons for the restrictions of ranges of lithium and iron to 10–30 mol percent and 70–85 mol percent, respectively, the ranges are naturally determined by the range of zinc. Lithium is important for maintaining a good temperature characteristic of a magnetic material and also has an advantage of lowering a firing temperature in the production to some extent and said advantage generally becomes greater with the increase of the amount of lithium. Said range of lithium, therefore, is effective. Regarding iron, it is needless to say that iron is an essential component for obtaining memory characteristic, and when the amount of iron is less than 70 mol percent, the signal output voltage is insufficient, and when more than 85 mol percent, hematite which is nonmagnetic substance is produced. Therefore, 70–85 mol percent of iron is effective.

Figure 3:
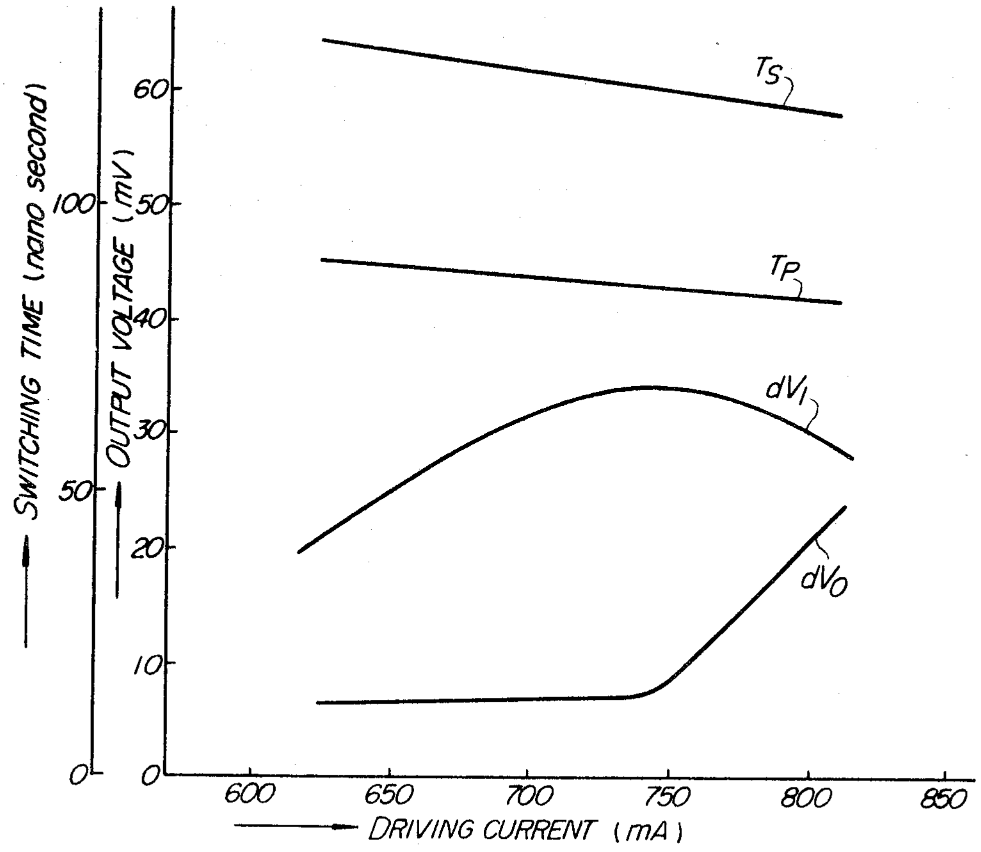
Figure 4:
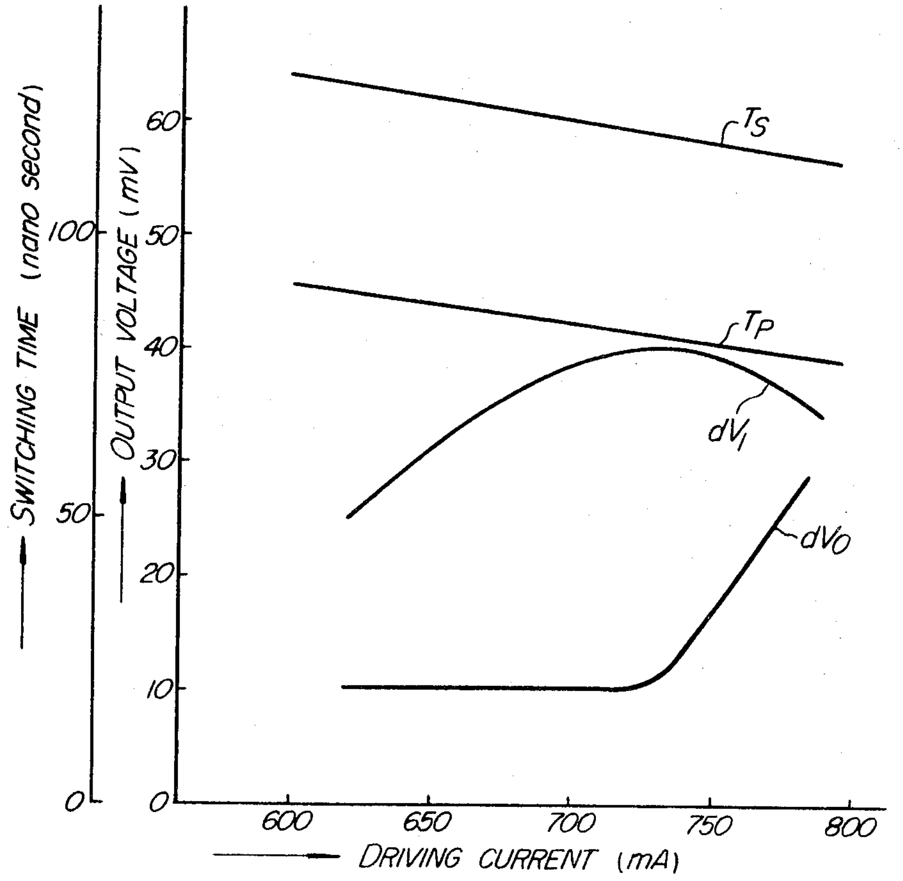
Figure 5:
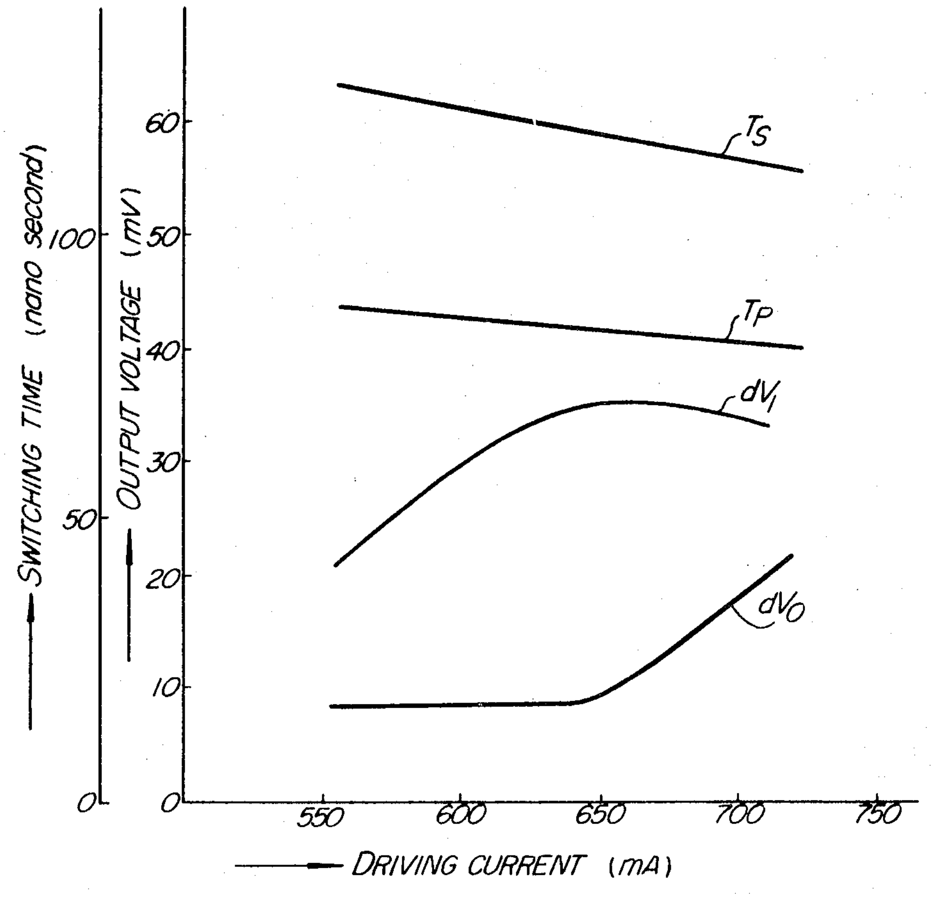

FIGS. 3, 4 and 5 are diagrams of memory characteristics which show one example of this invention. Samples used were ring cores of 0.3 mm. in outside diameter, 0.1 mm. in inside diameter and 0.09 mm. in thickness, and magnetic materials which constitute the cores were those produced by firing mixtures having the following raw material components. The production conditions were the same as those of Example 2 which will be shown later.

| | |
|---|---|
| Sample of FIG. 3 | |
| Lithium carbonate | 15 mol % |
| Zinc oxide | 5 mol % |
| Ferric oxide | 80 mol % |
| Vanadium pentoxide | 0.1% by weight |
| Sample of FIG. 4 | |
| Lithium carbonate | 13.25 mol % |
| Zinc oxide | 10 mol % |
| Ferric oxide | 76.75 mol % |
| Vanadium pentoxide | 0.1% by weight |
| Sample of FIG. 5 | |
| Lithium carbonate | 12.5 mol % |
| Zinc oxide | 12.5 mol % |
| Ferric oxide | 75 mol % |
| Vanadium pentoxide | 0.1% by weight |

In these Figures, T*s* represents switching time, T*p* peaking time, $dV_1$ signal output voltage and $dV_0$ noise output voltage.

As is clear from these Figures, the memory core produced in accordance with this invention has a signal output voltage of 30–40 *m*V and a switching time of 125–115 n. sec. (abbreviation of nanosecond) under a driving current of 600–750 *m*A. These are such excellent characteristic values as have not been possessed by the conventional Li–Zn system ferrite. Therefore, an extremely high speed electronic computer having high accuracy can be produced using the memory core material of this invention.

The important points required for a material for magnetic memory core are that squareness ratio $Rs=Br/Bm$ should be close to 1, that signal output voltage $dV_1$ and $dV_1/dV_0$, namely, S/N ratio should be great, that switching time T*s* should be small and that temperature characteristic should be excellent. Further, it is also important that memory core can be operated under a low driving current.

It has been known that addition of zinc is effective to lower the driving current, while the addition of zinc results in a disadvantage that square hysteresis is extremely deteriorated with the increase of amount of zinc added. Therefore, in an attempt to overcome said disadvantage, for example, use of cobalt, boron or vanadium with zinc such as U.S. Pat. No. 3,372,122 has been proposed, but these additives were not able to lead to excellent memory core.

The excellent characteristics of the magnetic material according to this invention depend not only upon vanadium, arsenic or bismuth added as subcomponent, but also upon the interaction between said additives and zinc especially for obtaining high signal output voltage under low driving current. That is, the inventors have found the combination of 3.5–20 mol percent of zinc and 0.01–1 percent by weight of said additives from the results of various experiments and the combination is the essential part of this invention.

When the amount of zinc exceeds 20 mol percent, since noise output voltage $dV_0$ becomes high, S/N ratio is lowered, and when the amount of zinc is less than 3.5 percent, signal output voltage is extremely reduced. Therefore, 3.5–20 mol percent of zinc is effective. Further, the additive as subcomponent is effective in an amount of 0.01–1 percent by weight as mentioned above. In this invention, the additives have effects on not only improving magnetic characteristic itself of the magnetic material, but also on lowering the final firing temperature by 50°–100° C. However, when the amount of the additives is more than 1 percent, hematite is considerably precipitated and unstable spinel type ferrite is produced to cause conspicuous reduction of output voltage and deterioration of properties as a memory core. Therefore, the composition containing more than 1 percent of the additives is not suitable as a material for memory core of electronic computer. Therefore, the amount of the additives as subcomponents should be up to 1 percent by weight as mentioned above.

According to this invention, not only the signal output voltage can be raised to a certain value which has never been attained with maintaining excellent square hysteresis, but also value of driving current for obtaining the maximum signal output voltage (most suitable driving current) can be changed by some extent by selecting the suitable amount of zinc and additives as subcomponents at suitable values.

The following examples illustrate this invention.

EXAMPLE 1

As raw materials, lithium carbonate $LiCO_3$, zinc oxide ZnO, ferric oxide $Fe_2O_3$, and vanadium pentoxide were weighed so that the components shown in Table 1 were obtained. These raw material mixtures were well ground and mixed with a grinder for about 3 hours. Then, these mixtures were subjected to prefiring at 850° C. for about 1 hour in air, cooled and thereafter ground for 15 hours with a ball mill into fine powders. The resultant finely powdered mixtures were molded to form a small troidal ring having the outside diameter of 15.8 mm. the inside diameter of 9.6 mm. and the thickness of 4.6 mm. Thus molded products were subjected to final firing at 1,110° C. for 2 hours in air. The magnetic characteristics of the thus obtained magnetic materials are shown in Table 1.

TABLE 1

| | Chemical components | | | | | |
|---|---|---|---|---|---|---|
| Sample No. | $Li_2O$ (mol. percent) | ZnO (mol. percent) | $Fe_2O_3$ (mol. percent) | $V_2O_5$ (weight percent) | Coercive force Hc oersteds | Squareness ratio Br/Bm |
| 1 | 16.67 | ---------- | 83.33 | ---------- | 8.4 | 0.90 |
| 2 | 15.75 | 2.50 | 81.75 | 0.1 | 7.0 | 0.92 |
| 3 | 15.0 | 5.0 | 80.0 | ---------- | 2.5 | 0.82 |
| 4 | 15.0 | 5.0 | 80.0 | 0.1 | 7.5 | 0.91 |
| 5 | 14.0 | 7.5 | 78.5 | 0.1 | 5.4 | 0.92 |
| 6 | 13.25 | 10.0 | 76.75 | 0.1 | 3.6 | 0.92 |
| 7 | 12.5 | 12.5 | 75.0 | 0.1 | 4.6 | 0.91 |
| 8 | 11.75 | 15.0 | 73.25 | 0.1 | 6.1 | 0.91 |
| 9 | 10.75 | 17.50 | 71.75 | 0.1 | 3.8 | 0.90 |
| 10 | 10.0 | 20.0 | 70.0 | 0.1 | 4.0 | 0.88 |

In Li–Zn system ferrite, generally the square hysteresis is conspicuously deteriorated with the increase of amount of zinc. However, it is clear from the above Table 1 that the deterioration due to the addition of zinc is prevented by vanadium. Rather, in some materials, for example, Sample No. 2, 4–8, even the improvement in square hysteresis was observed. It will be understood from Table 1 that increase of the amount of zinc to about 20 mol percent causes substantially no bad effect on the square hysteresis.

The following examples deal with memory characteristics of memory cores using the magnetic materials of this invention.

EXAMPLE 2

The mixtures after subjected to the prefiring as described in Example 1 were molded to form ring cores of 0.3 mm. in outside diameter, 0.1 mm. in inside diameter and 0.09 mm. in thickness. Then, thus molded products were subjected to the final firing at 1,070°–1,130° C. for 4–50 minutes in oxygen atmosphere to produce memory cores. The memory characteristics of thus obtained cores are shown in Table 2.

TABLE 2

| Sample No. | Most suitable driving current $I_D$(mA) | Signal output voltage $dV_1$ (mV) | Noise output voltage $dV_O$ (mV) | Switching time $T_s$ (nano second) | S/N ($dV_1$/$dV_O$) |
|---|---|---|---|---|---|
| 1 | 750 | 18 | 15 | 120 | 1.2 |
| 2 | 750 | 20 | 15 | 120 | 1.3 |
| 3 | 745 | 25 | 14 | 120 | 1.8 |
| 4 | 745 | 34 | 9.5 | 140 | 3.6 |
| 5 | 740 | 37 | 10.0 | 139 | 3.7 |
| 6 | 730 | 40 | 10.5 | 137 | 3.8 |
| 7 | 640 | 35 | 9.5 | 135 | 3.7 |
| 8 | 600 | 37 | 10.0 | 135 | 3.7 |
| 9 | 590 | 38 | 10.5 | 140 | 3.6 |
| 10 | 560 | 37.5 | 10.7 | 148 | 3.5 |

Regarding especially cores of Sample No. 4, 6 and 7, more detailed characteristic curves are shown in FIGS. 3, 4 and 5, respectively.

As is clear from said Table 2 and characteristic curves, as shown in FIGS. 3, 4 and 5 cores produced from the magnetic materials of this invention had extremely excellent memory characteristic.

EXAMPLE 3

A memory core was produced by the same method as of Example 2 using raw material components of 13.25 mol percent of lithium carbonate, 10 mol percent of zinc oxide, 76.75 mol percent of ferric oxide and 0.1 percent by weight of arsenic oxide. The memory characteristic of this sample is shown by Sample No. 11 in TAble 3 and is nearly the same as that of Sample No. 6 in Table 2.

EXAMPLE 4

A memory core was produced by the same method as of Example 2 using the raw material components of 12.5 mol percent of lithium carbonate, 12.5 mol percent of zinc oxide, 75 mol percent of ferric oxide and 0.1 percent by weight of bismuth oxide. The memory characteristic of this sample is shown by Sample No. 12 in TAble 3 and is nearly the same as that of Sample No. 7 in Table 2.

EXAMPLE 5

A memory core was produced by the same method as of Example 2 using raw material components of 15.0 mol percent of lithium carbonate, 5 mol percent of zinc oxide, 80 mol percent of ferric oxide, 0.01 percent by weight of vanadium pentoxide and 0.5 percent by weight of arsenic oxide. The memory characteristic of this sample is shown by Sample No. 13 in Table 3 and is nearly the same as that of Sample No. 3 in Table 2.

EXAMPLE 6

A memory core was produced by the same method as of Example 2 using raw material components of 11.75 mol percent of lithium carbonate, 15.0 mol percent of zinc oxide, 0.01 percent by weight of arsenic oxide and 0.5 percent by weight of bismuth oxide. The memory characteristic of this sample is shown by Sample No. 14 in Table 3 and is nearly the same as that of sample No. 8 in Table 2.

EXAMPLE 7

A memory core was produced by the same method as of Example 2 using raw material components of 10.75 mol percent of lithium carbonate, 17.50 mol percent of zinc oxide, 71.75 mol percent of ferric oxide, 0.01 percent by weight of vanadium oxide, and 0.1 percent by weight of arsenic oxide. The memory characteristic of this sample is shown by Sample No. 15 in Table 3 and is nearly the same as that of Sample No. 9 in Table 2.

EXAMPLE 8

A memory core was produced by the same method as of Example 2 using raw material components of 13.25 mol percent of lithium carbonate, 10.0 mol percent of zinc oxide, 76.75 mol percent of ferric oxide, 0.01 percent by weight of vanadium oxide, 0.1 percent by weight of arsenic oxide and 0.1 percent by weight of bismuth oxide. The memory characteristic of this sample is shown by Sample No. 16 in Table 3 and is nearly the same as that of Sample No. 6 in Table 2.

TABLE 3

| Sample No. | Most suitable driving current $I_D$(mA) | Signal output voltage $dV_1$ (mV) | Noise output voltage $dV_O$ (mV) | Switching time $T_s$ (nano second) | S/N ($dV_1$/$dV_O$) |
|---|---|---|---|---|---|
| 11 | 730 | 41 | 10.7 | 135 | 3.8 |
| 12 | 640 | 37 | 10.0 | 130 | 3.7 |
| 13 | 745 | 36 | 10.2 | 135 | 3.5 |
| 14 | 600 | 35 | 9.5 | 130 | 3.7 |
| 15 | 590 | 38 | 10.8 | 137 | 3.5 |
| 16 | 730 | 43 | 11.0 | 135 | 3.9 |

What is claimed is:

1. A lithium-zinc ferrite composition consisting essentially of 10 to 30 mol percent of $Li_2O$, 3.5 to 20 mol percent of ZnO and 70 to 85 mol percent of $Fe_2O_3$ as the main components; and in addition at least one metal oxide selected from the group consisting of arsenic oxide and bismuth oxide as subcomponents, the content of the metal oxide being 0.01 to 1 weight percent with respect to the main components.

2. A lithium-zinc ferrite composition claimed in claim 1, in which the metal oxide content is 0.06 to 0.5 weight percent.

3. A lithium-zinc ferrite composition claimed in claim 1 in which the metal oxide content is about 0.1 weight percent.

4. A method of producing lithium-zinc ferrite composition comprising the steps of 1. mixing 10 to 30 mol percent of lithium oxide or lithium compound which is convertible to the oxide by firing, the amounts of said lithium compound being sufficient to produce said quantity of lithium oxide, 3.5 to 20 mol percent of zinc oxide or zinc compound which is convertible to the oxide by firing, the amounts of said zinc compound being sufficient to produce said quantity of zinc oxide, and 70 to 85 mol percent of iron oxide or iron compound which is convertible to the oxide by firing, the amounts of said iron compound being sufficient to produce said quantity of iron oxide as main components; and 0.01 to 1 weight percent with respect to the main components of at least one member selected from the group consisting of arsenic oxide, bismuth oxide, arsenic compound which is convertible to the oxide by firing, and bismuth compound which is convertible to the oxide by firing, the amounts of these compounds being sufficient to produce said quantity of corresponding metal oxide,
2. firing the mixed product in a prefiring step at a temperature within the range of 800° to 1,000° C. under the atmosphere containing oxygen,
3. grinding the prefired product,
4. molding the ground product to a desired shape, and
5. firing the molded product in a final firing step at a temperature within the range of 1,050° to 1,150° C. under the atmosphere containing oxygen.

5. A method for producing lithium-zinc ferrite composition claimed in claim 4, in which said member is present in an amount of 0.06 to 0.5 weight percent.

6. A method for producing a lithium-zinc ferrite composition according to claim 4 in which said member is present in an amount of about 0.1 weight percent.

7. A magnetic memory core which consists essentially of 10 to 30 mol percent of $Li_2O$, 3.5 to 20 mol percent of ZnO and 70 to 85 mol percent of $Fe_2O_3$ as the main components; and in addition at least one metal oxide selected from the group consisting of arsenic oxide and bismuth oxide as subcomponents, the content of the metal oxide being 0.01 to 1 weight percent with respect to the main components.

8. The magnetic memory core of claim 7 wherein the metal oxide content is 0.06 to 0.5 weight percent.

* * * * *